(12) United States Patent
Lindhorst et al.

(10) Patent No.: US 7,475,075 B2
(45) Date of Patent: Jan. 6, 2009

(54) INTEGRATION RICH CLIENT VIEWS IN SERVER PRESENTATIONS

(75) Inventors: Gregory S. Lindhorst, Seattle, WA (US); Andrew R. Miller, Issaquah, WA (US); Cyrus R. Balsara, Sammamish, WA (US); Jason A. Bould, Bellevue, WA (US); Jianlan Song, Sammamish, WA (US); Neil W. Black, Seattle, WA (US); Paul D. Bishop, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 212 days.

(21) Appl. No.: 11/223,455

(22) Filed: Sep. 9, 2005

(65) Prior Publication Data

US 2007/0074120 A1    Mar. 29, 2007

(51) Int. Cl.
*G06F 17/30* (2006.01)
(52) U.S. Cl. .................. 707/10; 707/104.1; 709/203
(58) Field of Classification Search ............... 707/10, 707/102, 104.1, 200; 709/209, 203
See application file for complete search history.

(56) References Cited

U.S. PATENT DOCUMENTS

| | | | |
|---|---|---|---|
| 6,341,310 B1 | 1/2002 | Leshem et al. ............... 703/223 |
| 6,732,191 B1 | 5/2004 | Baker et al. .................... 710/1 |
| 6,785,721 B1 | 8/2004 | Immerman et al. .......... 709/220 |
| 6,883,168 B1 | 4/2005 | James et al. ................. 717/178 |
| 2004/0024610 A1 | 2/2004 | Fradkov et al. ................ 705/1 |
| 2004/0111424 A1 | 6/2004 | Roman et al. ................ 707/100 |
| 2004/0267701 A1 | 12/2004 | Horvitz et al. ................. 707/2 |
| 2005/0071758 A1* | 3/2005 | Ehrich et al. ................ 715/513 |
| 2005/0086221 A1 | 4/2005 | Parker ............................ 707/4 |
| 2005/0102358 A1 | 5/2005 | Gold et al. .................. 709/204 |
| 2005/0177401 A1 | 8/2005 | Koeppel et al. ................ 705/4 |
| 2005/0246637 A1* | 11/2005 | Knight et al. ................ 715/700 |
| 2007/0016575 A1* | 1/2007 | Hurst-Hiller et al. ........... 707/5 |

FOREIGN PATENT DOCUMENTS

WO    WO 00/73920    12/2000

OTHER PUBLICATIONS

Schneider, B., "Integrating Content Management Server with SharePoint Portal", http://www.cmswatch.com/Feature/107?printable=1, May 17, 2004, 8 pgs.

(Continued)

*Primary Examiner*—Cheryl Lewis
(74) *Attorney, Agent, or Firm*—Merchant & Gould (57) ABSTRACT

A rich client view of server data is integrated within a server presentation of data provided by a portal server application. The rich client view of data is included with other web based views provided according to the server presentation of data when the rich client view is created. The rich client view is integrated among the web based views such that the rich client view and web based views are organized together. A separate application is launched to render the rich client view in response to a selection to render the rich client view. The selection to render the rich client view is integrated within the server presentation of data such that rich client view is provided seamlessly within the server presentation.

20 Claims, 8 Drawing Sheets

OTHER PUBLICATIONS

"Microsoft Outlook 2003 Integration with SharePoint Products and Technologies", http://microsoft.com/technet/prodtechnol/sppt/reskit/c406188lx.mspx, Jun. 9, 2004, 18 pgs.

"Collaborative Application Integration, Extension, and Migration With CASAHL ecKnowledge®", CASAHL Technology, http://www.casahl.com, Jan. 2004, 8 pgs.

"Enterprise Data Integration for Collaborative Applications", CASAHL Technology, http://casahl.com, Sep. 2002, 12 pgs.

"Optimize Your Collaborative Applications", CASAHL Technology, http://www.casahl.com, Oct. 31, 1996, 1 pg.

Schneider, B., "Integrating Content Management Server with SharePoint Portal", http://www.cmswatch.com/Feature/107?printable=1, May 17, 2004, 22 pgs.

"Microsoft Outlook 2003 Integration with SharePoint Products and Technologies", http://microsoft.com/technet/prodtechnol/sppt/reskit/c406188lx.mspx, Jun. 16, 2004, 16 pgs.

\* cited by examiner

INTEGRATION RICH CLIENT VIEWS IN SERVER PRESENTATIONS

BACKGROUND

As the number of applications available for performing tasks on a computing device increases the expectation for a seamless user experience among these applications also increases. When working in one application, there is an expectation that the transition to other applications and/or support of the other applications is seamless and does not interrupt the user from their tasks to handle the transition.

One type of application that has gained great ground in its integration and use among companies and enterprises are portal server applications. Portal server applications enable enterprises to develop an intelligent portal that seamlessly connects users, teams, and knowledge so that these users can take advantage of relevant information across business processes to help them work more efficiently. A portal server application provides an enterprise business solution that integrates information from various systems into one solution through single sign-on and enterprise application integration capabilities. The portal facilitates end-to-end collaboration by enabling aggregation, organization, and search capabilities for people, teams, and information. Users are able to find relevant information quickly through customization and personalization of portal content and layout, as well as by audience targeting. Organizations are able to target information, programs, and updates to audiences based on their organizational role, team membership, interest, security group, or any other membership criteria that can be defined. Document versioning, approval workflow, check in and check out, document profiling, and publishing provided through the portal server application facilitate easy collaboration on documents, projects, and tasks.

Web based technologies used by some web portal server applications and other data driven web applications are typically limited to hypertext markup language (HTML), or controls embedded in HTML, for rendering views of the data on the web site. More recently, some applications such as spreadsheet applications, presentation applications, and other rich applications are able to provide a rich view on this data, allowing for quick filtering, sorting, and editing, without the limitations of HTML. The problem is that these two worlds are presented to the user as quite different and not very well connected. To use these rich views to view the portal server data has often required that the user know that this is possible. Also the user is generally required to launch the application themselves manually. Furthermore, management of the storage of these rich views is left to the user, with that storage typically not nearby where the data that was being viewed lives.

SUMMARY

Aspects of the present invention are generally related to integrating rich client views of data among web based views of data supported by a portal server application. One aspect allows rich client views to be provided more seamlessly along with the other views provided by a portal server application. For example, a rich client view of a database report built by a database management application may be stored and listed along side other web based views that the portal server application supports. With the rich client view provided alongside the other views the user of a database report need not know that the database management application is a good server presentation tool ahead of time. The user may launch the database report directly from the web page with a single click, just as if they were opening a web based view associated with the portal server application. When the report is selected, the database management application is automatically launched and used to render the database report. Launching the rich client view of the database report directly from the selection of views makes the database management application feel similar to a natural extension of the portal server application. From a user perspective the rich client view is not substantially different from the web based views.

One aspect of providing the seamless connection between a web site and a rich user application includes listing the rich client views as peers to web based views, where either can be launched with a single click. Another aspect of providing the seamless connection includes advertising the ability to create a rich client view as a peer to a web based view. A web page that lists the types of views that may be created in connection with a web site includes both the rich client views and the web based views. Still another aspect includes handling the storage of the rich client views to include the rich client views in association with the web site.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of the present invention are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments of the present invention may be practiced as methods, systems or devices. Accordingly, embodiments of the present invention may take the form of an entirely hardware implementation, an entirely software implementation or an implementation combining software and hardware aspects. The following detailed description is, therefore, not to be taken in a limiting sense.

The logical operations of the various embodiments of the present invention are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, steps or modules.

Figure 1:
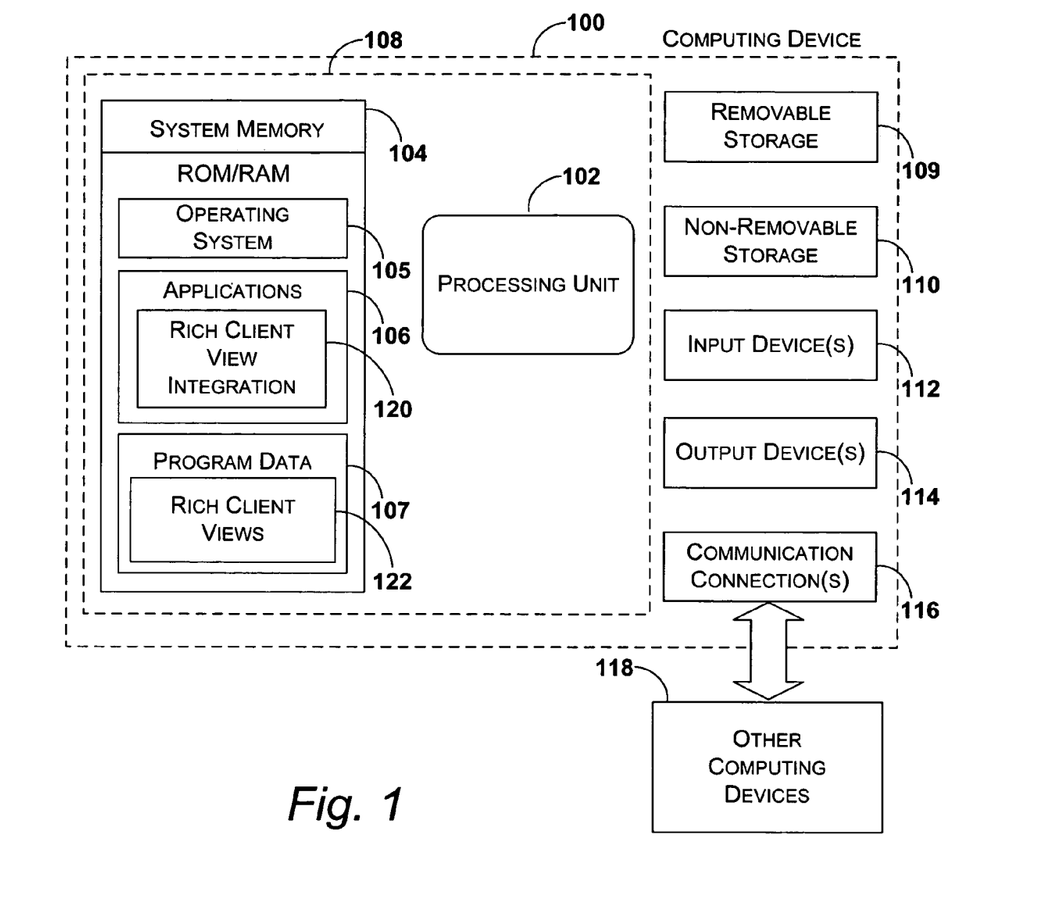
FIG. 1 illustrates an exemplary computing device that may be used in accordance with one exemplary embodiment.

With reference to FIG. 1, one exemplary system for implementing the invention includes a computing device, such as computing device 100. Computing device 100 may be configured as a client, a server, mobile device, or any other computing device. In a very basic embodiment, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 includes a rich client view integration system 120 for implementing the system of the present invention. Additionally, program data 107 includes rich client views 122. This basic embodiment is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

An embodiment executed by a system including computing device 100 provides rich client views 122 of data seamlessly integrated into a server presentation of data. Rich client views are listed along side other views in a portal server application's list of views. When selected from this list, the application that generated the rich client view is launched on the client computing device and the requested rich client view is displayed. This allows the user to launch a rich client view within a portal server or web site context, without first launching the application that created the rich client view or requiring knowledge of the path to the report in memory. According to one perspective, the rich client views are no different than a web based view.

When creating a new view for a list, the web page that lists the different types of views that can be created also includes rich client views as view types. When a rich client view is selected, the client application corresponding to that view is launched, allowing the user to create a rich client view. The file corresponding to that rich client view is stored to the web site, and the newly created view is added to the list of views.

Except for a broader meaning that allows the disclosure and claims herein to encompass a wider variety of alternative embodiments, the following terms as used herein and throughout the claims are generally defined as follows:

"Document" is generally defined as any page, sheet, form, or other construction of an application that comprises text, graphical objects, tables, data cells, or other types of data representations. Examples of documents include word processor documents, spreadsheets, databases, charts, slides, web pages, worksheets, notes, e-mail messages, instant messages, drawings, schematics, images, and other arrangements of text and/or graphical objects.

"Rich client view" or "rich view" generally refers to a view of data that allows a level of interaction with the data that is not present for web based views (see below). Rich client views may include forms, reports, datasheets, and other documents created by applications separate from the server application that lists the views. These documents may be created by client applications resident on a client computing device, or other applications stored in a network environment. Additional functionality is also associated with a rich client view. In particular, data in a rich client view may be changed and entered, and data from the view may be taken offline and used outside the context of a server application.

"Server application" or "portal server application" generally refers to an application that is directed to providing access, display, and interaction with data on a network. The server application generally organizes the data into one or more web sites that contain one or more web pages. The server application also provides links and access to other types of data in other forms providing an organization of the disparate data included on the network. A portal server application is a particular type of server application that provides a "portal" or a web site that offers a broad array of resources and services, such as e-mail, home pages, search engines, database management, and the like.

"Server presentation" is generally defined as the aggregate of rendered and displayed data provided by the server application. The server presentation corresponds to the entire content, such as web pages, views, windows, dialogs, page sections, and other data sources provided for display by a server application. The data sources may correspond to a theme or goal that the server application is attempting to convey (e.g., a portal server application provides portal access). Data provided according to the server presentation is considered as integrated into the data sources accessed by the server application regardless of the origins of that data source.

"Web based view" is generally defined as a view of data provided by a server application such as a portal server application. In one embodiment, the web based view corresponds to a hypertext markup language (HTML) based view of the data. The web based view is generated to correspond to the user interface provided by a server application, and is therefore limited in the features and qualities of the view by the features that user interface provides.

Figure 2:
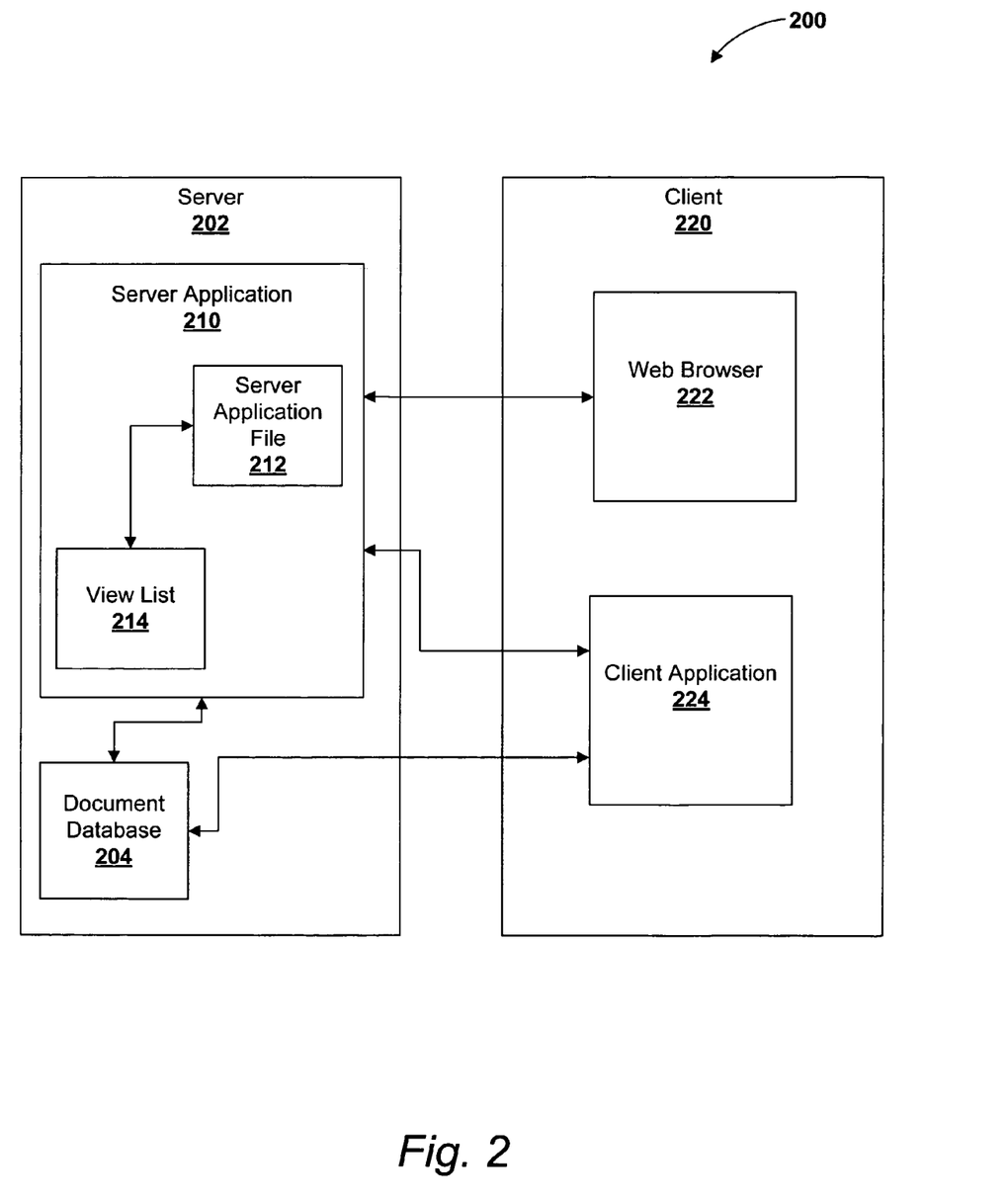
FIG. 2 illustrates a functional diagram of an exemplary system for integrating rich client views into the presentation of server data.

FIG. 2 illustrates a functional diagram of an exemplary system for integrating rich client views into the presentation of server data in accordance with one embodiment. System 200 includes server 202 and client 220. Both server 202 and client 220 represent computing devices that communicate over a network. Server 202 manages network resources while client 220 consumes them on behalf of a user. Server 202 and client 220 may communicate over any network (e.g., Internet) whether public or private.

Server 202 further includes document database 204 and server application 210. Server application 210 includes server application file 212 and view list 214. Client 220 includes web browser 222 and client application 224.

In one embodiment, server application 210 corresponds to a portal server application that provides portal services to users on a network. One example of portal server software is provided by the SharePoint® portal server software suite created by the Microsoft Corporation of Redmond, Washington. Such portal server software provides access to data and other resources across a network providing an extremely useful server application. However, the views of the data provided by such portal server software applications may not be as useful as other views depending on the format of the data. For example, a database may be accessed through a view provided by server application 212. However, such a view is generally not sophisticated, usually being limited to an HTML representation that includes the data from the database. In contrast, database management systems such as the Access® database management software also created by the Microsoft Corporation, may provide much more sophisticated views of the data that include reports and forms that provide a level of data analysis.

Server application file 212 corresponds to the list or web page that corresponds to the server presentation of the data. Server application file 212 includes a link to view list 214. View list 214 provides a list of the views that corresponds to server application file 212. View list 214 may include views that are web based views and views that correspond to rich client views. View list 214 also includes a link to document database 204. The documents of document database 204 correspond to the views associated with server application file 212. In an additional embodiment, document database 204 is included within server application 210.

When creating and displaying the views included in view list 214, server 202 passes the data corresponding to the view to client 220. The view may correspond to a web based view or a rich client view. If the view is a web based view, the data may be obtained from server application file 212 by web browser 222. Web browser 222 may then be used to create or display the web based view. In contrast, if the view being created or displayed corresponds to a rich client view, then client application 224 is launched. Client application 224 corresponds to the client application in which the view was created or is to be created. Once the view is displayed or created in client application 224, the server presentation of data is also updated to list the availability of the new rich client view.

Previously, when a user would want to surface server data in client application 224, the user would have to open client application 224 first, and then link the application back to the server data. Some client applications (e.g., 224) incorporated the concept of views (e.g., views provided in the Access® database management software described above). However, the views listed in the client application 224 were not related to the views listed by server application 210. Embodiments described herein avoid these limitations by automatically providing the rich client views among the other web based views and allowing the data to be surfaced by client application 224 through a single click of a rich client view in the server application 210.

In another embodiment, server application 210 includes a number of lists that may be generated that each correspond to a selection of data. For example, a list may be created that corresponds to certain issues, contacts, tasks, or similar data sets. Each list may have associated views. In this embodiment, client application 224 is organized as a database management application. As a database management application, client application 224 is organized into tables, with a number of forms and reports associated with each table where each form or report corresponds to a view. In this embodiment, a link may be made between the tables and the lists, where list A of the server application is linked to table A of the client application. With this link established, the forms and reports of table A are provided in the view listing of list A. Some forms, reports, spreadsheets, and the like may be associated with more than one table. If associated with multiple tables, these rich client views may then be associated with more than one list provided by the server application.

Figure 3:
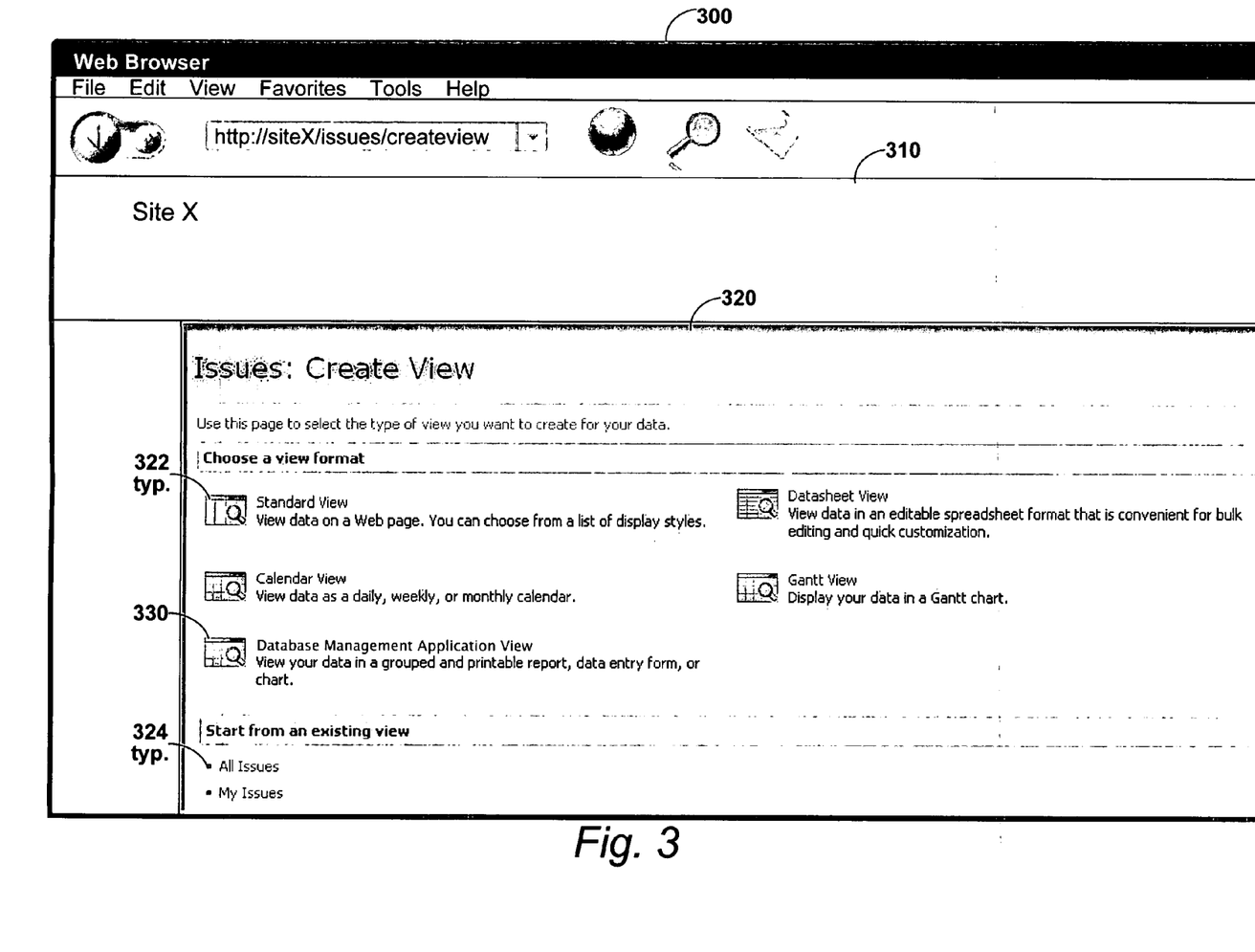
FIG. 3 illustrates an exemplary screenshot of a view creation page.

FIG. 3 illustrates an exemplary screenshot of a view creation page in accordance with one embodiment. View creation page 300 corresponds to a web page provided in association with a portal server application and is exemplary of the creation of views for a server application.

View creation page 300 includes page identifier section 310 and view creation section 320. Page identifier section 310 identifies the page and its association to a web site that represents the portal server. View creation section 320 is provided to allow a user to select which type of view (e.g., 322) the user desires to create. For example, a user may select to generate a standard view of the data (e.g., 322). One of the view types provided in the current example is database management application view 330. Database management application view 330 corresponds to a rich client view. Selecting database management application view 330 initiates the process for generating the rich client view. Exemplary processes for generating, updating, and rendering rich client views are provided in greater detail below in the discussion of FIGS. 7 and 8.

Additionally, a user may also be provided a selection in view creation page 300 to create a new web based view using an existing view as a template. In one embodiment, existing views (e.g., 324) are provided in a list within view creation section 320 for selecting an existing view as a template.

The illustrated embodiment shows the rich client views listed among the web based views for selecting a view to be created. Alternative embodiments may separate the rich client views into a separate section of the same web page, or to a separate web page.

View creation page 300 is shown as included in a web browser frame. Web browsers include features and menus that are generally known in the art and are not considered as limiting upon the embodiments provided. These web browser elements are therefore not discussed in detail herein. Furthermore, view creation page 300 may be rendered in another context than the web browser shown, or may be provided in a pop-up window, flyout window, or the like.

Figure 4:
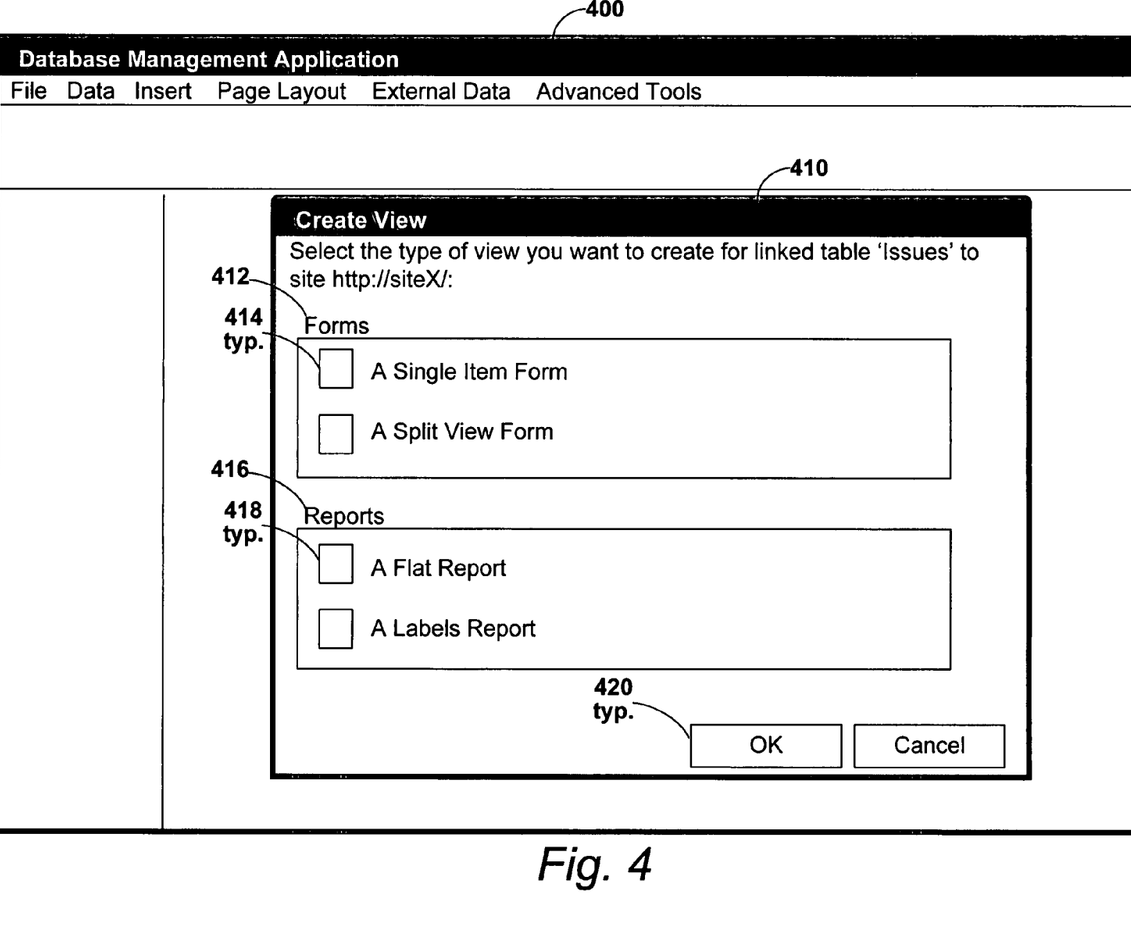
FIG. 4 illustrates an exemplary screenshot of database management application launched to create a rich client view.

FIG. 4 illustrates an exemplary screenshot of database management application launched to create a rich client view in accordance with one embodiment. Database management application 400 includes create view window 410 when a user has selected to create a new view. Create view window 410 allows a user to select the type of view desired in the database management application. In one embodiment, the rich client view is linked to the server application upon generation within database management application 400. For example, the generate view operation may have been initiated in the server application from a view creation page (e.g., view creation page 300 of FIG. 3). In another embodiment, the rich client view was created in database management application 400 prior to being linked to a server application file (e.g., server application file 210 of FIG. 2). When the rich client view is generated prior to any linking to a server application file, a user may affirmatively select to establish the link.

Create view window 410 includes forms 412 and reports 416 that may be generated. Forms 412 and reports 416 correspond to particular types of views associated with database management application 400. Each type of view may include many different individual views (e.g., 414 and 418). Once a user has selected the view to be created, the user may then actuate a selection confirmation button (e.g., OK button 420) to either create the view or cancel the operation. An exemplary process for creating a view is described in greater detail below in the discussion of FIG. 7.

Database management application 400 is shown with drop-down menus (e.g., file, data, etc.) particular to the application, and may include other toolbars, features, and commands related to the functionality of database management application 400. Database management applications include features and menus that vary greatly depending on the particular database management application used. These different menus and toolbars are not considered as limiting upon the embodiments provided and are therefore not discussed in detail herein. Furthermore, embodiments of the present invention are not limited to rich client views that are generated in database management applications. The rich client views may correspond to a host of other applications, including but not limited to spreadsheet applications, word processor applications, editor applications, and the like.

Additionally, create view window 410 is context specific to a database management application similar to the database management application described herein. Other applications in which a rich client view is being created may have different view creation user interfaces.

Figure 5:
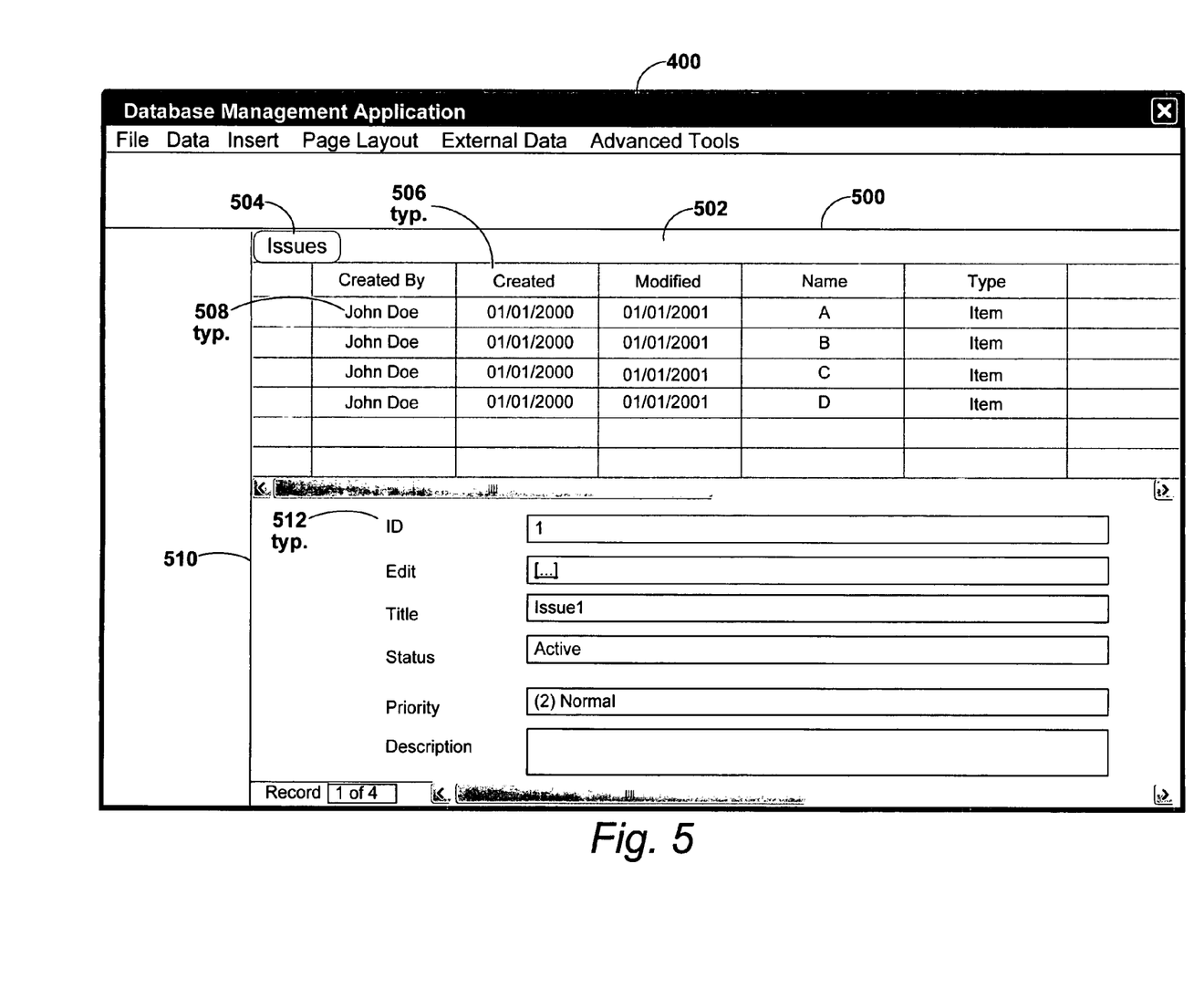
FIG. 5 illustrates an exemplary screenshot of a created rich client view within a database management application.

FIG. 5 illustrates an exemplary screenshot of a created rich client view within a database management application in accordance with one embodiment. Database management application 400 includes rich client view 500 of the data. In the present example, rich client view corresponds to an issues list provided by a server application. Rich client view includes data table 502 and record module 510. Data table 502 provides a view of a table of data categories (e.g., 506) and data cells (e.g., 508) that correspond to the data of the list. Record module 510 includes a presentation of the properties of each record in the table. In one embodiment, rich client view 500 includes label 504 that associates rich client view 500 with a particular list or other server application file.

Rich client view 500 allows for greater manipulation and interaction with the data than would be available if this view were provided by the web server itself. Embodiments described herein allow users to take advantage of rich client views of the data seamlessly arranged with the web based views that were previously provided.

Figure 6:
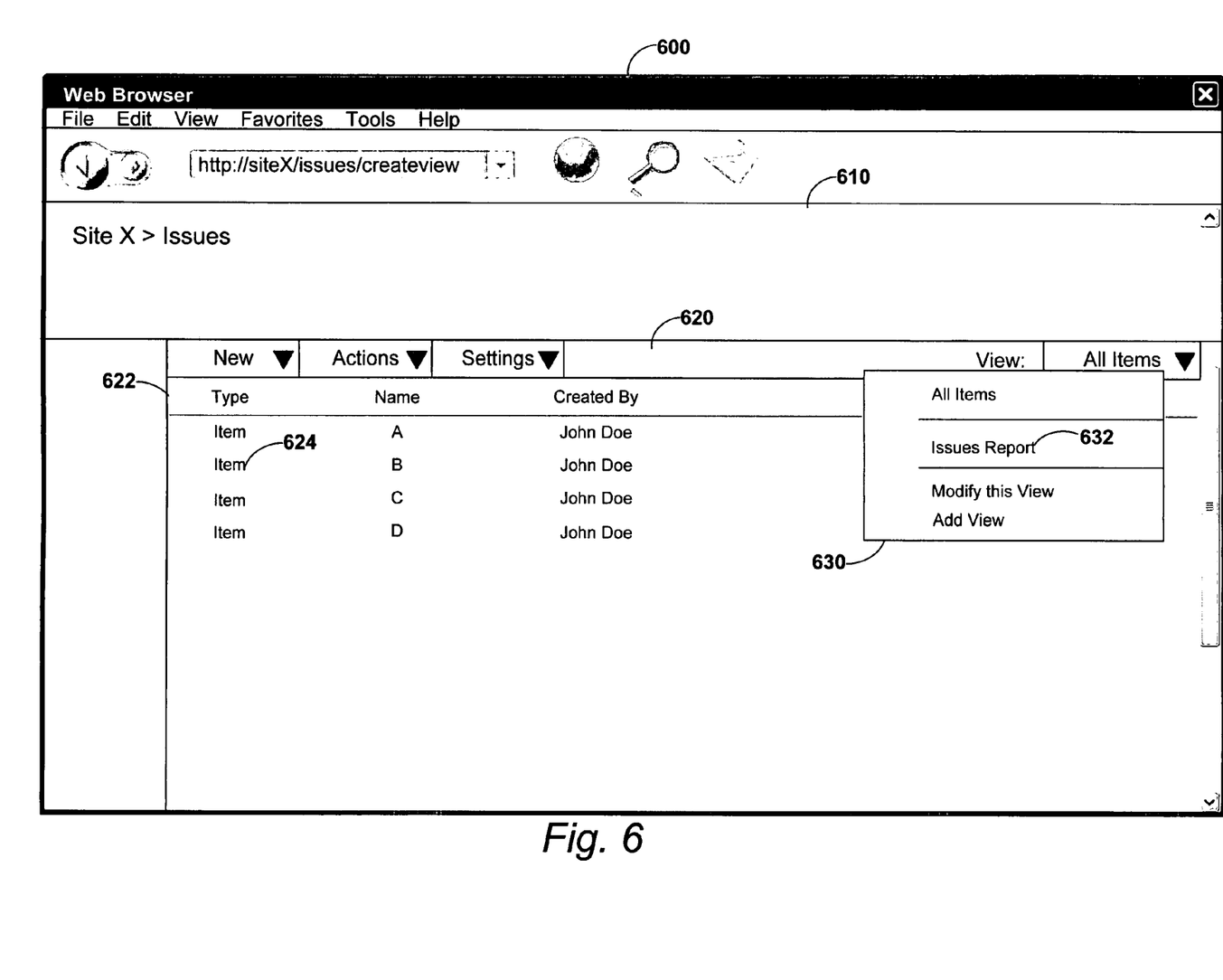
FIG. 6 illustrates an exemplary screenshot of a web page with a rich client view listed amongst a list of views.

FIG. 6 illustrates an exemplary screenshot of a web page with a rich client view listed amongst a list of views in accordance with one embodiment. Web page 600 corresponds to a portal server list that provides an arrangement of data included on the server. Web page 600 includes page identifier section 610 and list section 620. Page identifier section 610 identifies the page and its association to a web site that represents the portal server. List section 620 provides a display of the data categories (e.g., 622) and the data (e.g., 624) included in the list. List section 620 also includes view list 630. View list 630 includes a listing of the views corresponding to the portal server list. View 632 listed in view list 630 corresponds to the rich client view 500 previously generated in the launched client application. Listing the rich client views in view listing 630 integrates a selection for the rendering rich client view 630 within view listing 630.

Figure 7:
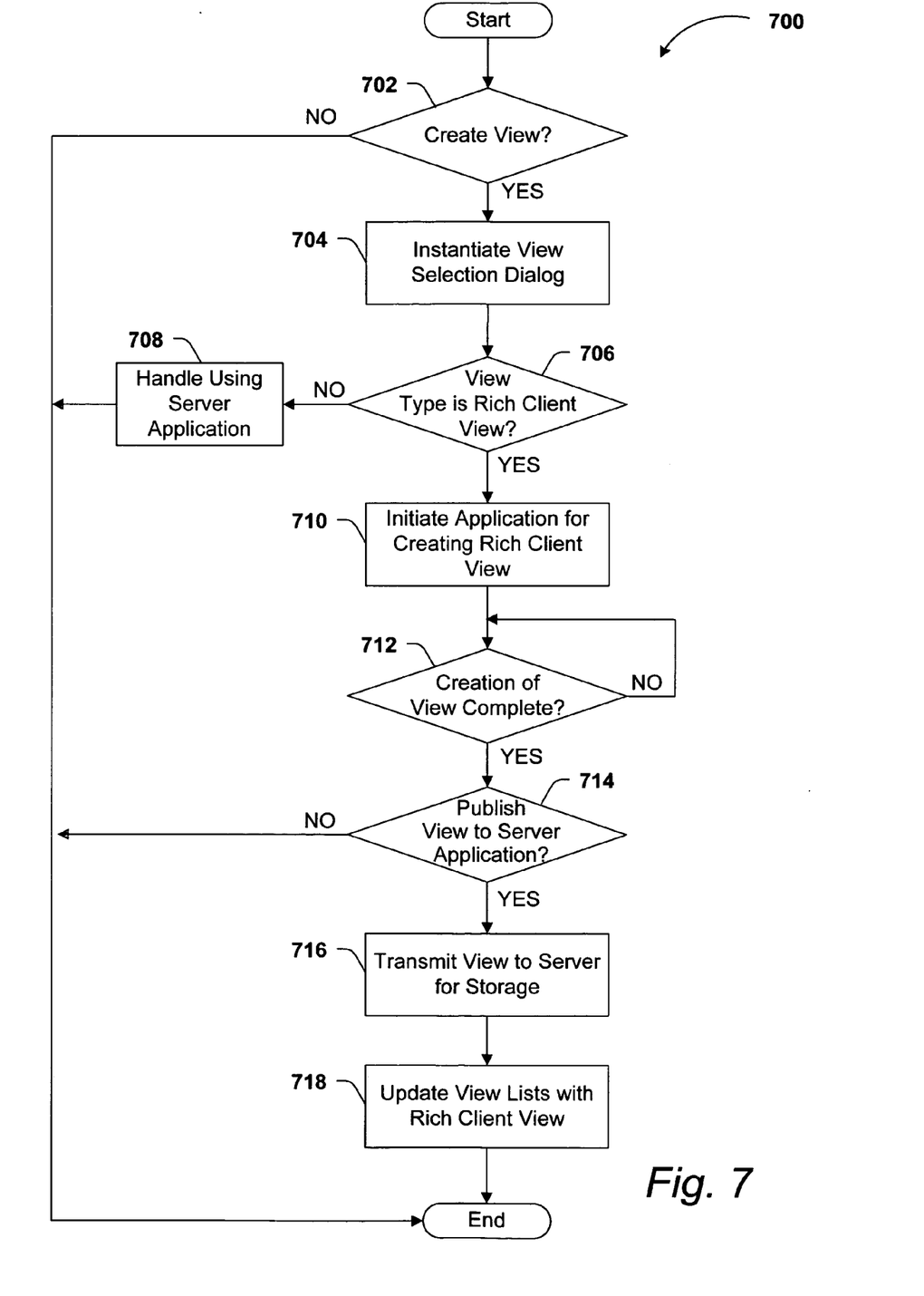
FIG. 7 illustrates an operational flow diagram of an exemplary process for creating a rich client view and updating a server presentation with the rich client view.

FIG. 7 illustrates an operational flow diagram of an exemplary process for creating a rich client view and updating a server presentation with the rich client view in accordance with one embodiment. Process 700 starts when a user has a server application such as a portal server application launched and is interacting with data within the portal server application. Processing continues at create decision operation 702.

Create decision operation 702 makes a determination whether a user has selected to create a view. A user may select to create a view according to a selection or other menu item provided as part of the server presentation of data. If the user has not selected to create a view, process 700 ends, and processing moves on to other tasks such as manipulating existing views, or other manipulations of the data. In contrast, if the user has selected to create a view, processing continues to selection operation 704.

Selection operation 704 initiates a web page, window, or the like that allows a user to select the type of view to create. In one embodiment, the web page is similar to view creation page 300 described above in the discussion of FIG. 3. Once the view selection web page is generated, processing continues with view type determination operation 706.

View type determination operation 706 determines the type of view selected by the user in the view selection web page. The view may correspond to a web based view or a rich client view. If the view does not correspond to a rich client view, processing moves to server handling operation 708.

Server handling operation 708 allows the server to handle generation of the view since the view is not a rich client view. If generation of the view is passed to the server application for handling, process 700 ends, and processing moves on to other tasks such as manipulating existing views, or other manipulations of the data.

Alternatively, if the view does correspond to a rich client view in view type determination operation 706, processing continues with client initiation operation 710. Client initiation operation 710 initiates the client application corresponding to the view type selection made. For example, if the view type selected was a database management application view, then the database management application is initiated. In one embodiment, a server-side component is used to launch the application that corresponds to the rich client view selected.

After the appropriate application is launched, processing continues with completion decision operation 712.

Completion decision operation 712 determines whether creation of a rich client view within the client application is completed. In one embodiment, completion of the rich client view is indicated by the user selecting to save the view. If creation of the rich client view is not complete (and has not been aborted or canceled) processing repeats creation completion decision 712 until the rich client view is completed. If completion of the rich client view is indicated, processing continues with publication decision operation 714.

Publication decision operation 714 determines whether the completed rich client view should be published back to the server application. In one embodiment, a notification is launched that requests the user to decide whether to publish the application back to the server. In one embodiment, the notification makes a statement such as, "This view was opened from a server. Do you desire to republish this database on the server? The database will be stored in a document database and the views will be available from their associated server application files." The user is then able to decide whether to publish the view to the server. In one embodiment, when a new rich client view is published back to the server application, the server application populates a database file that is associated with the server application file with the view. The database file includes the views already existing for that server application file. This allows the new view to be stored consistently with the other views of the server application file, rather than storing the newly created rich client view separately. If the decision is made not to publish the view to the server, process 700 ends, and processing moves on to other tasks such as manipulating existing views, or other manipulations of the data.

Alternatively, if a decision is made to publish the view to the server, processing continues with transmission operation 716. Transmission operation 716 transmits the view to the server and stores the view in the document database (e.g., document database 204 of FIG. 2). Once the view is stored, processing continues with update view list operation 718.

Update view list operation 718 updates the view lists associated with the related server application files to include an entry for the rich client view. In one embodiment, the entry provides a link to the view included in the document database. In another embodiment, the related application files correspond to those files with underlying data that corresponds to the underlying data of the rich client view. In still another embodiment, a server-side component populates the view list with the rich client view and associates the rich client view with a uniform resource locator (URL) that identifies the view document in the document database. In an additional embodiment, the rich client view in the view list also identifies the particular view in the view document to which the listed rich client view applies. After the view lists are updated, process 700 ends, and processing moves on to other tasks such as manipulating existing views, or other manipulations of the data.

Figure 8:
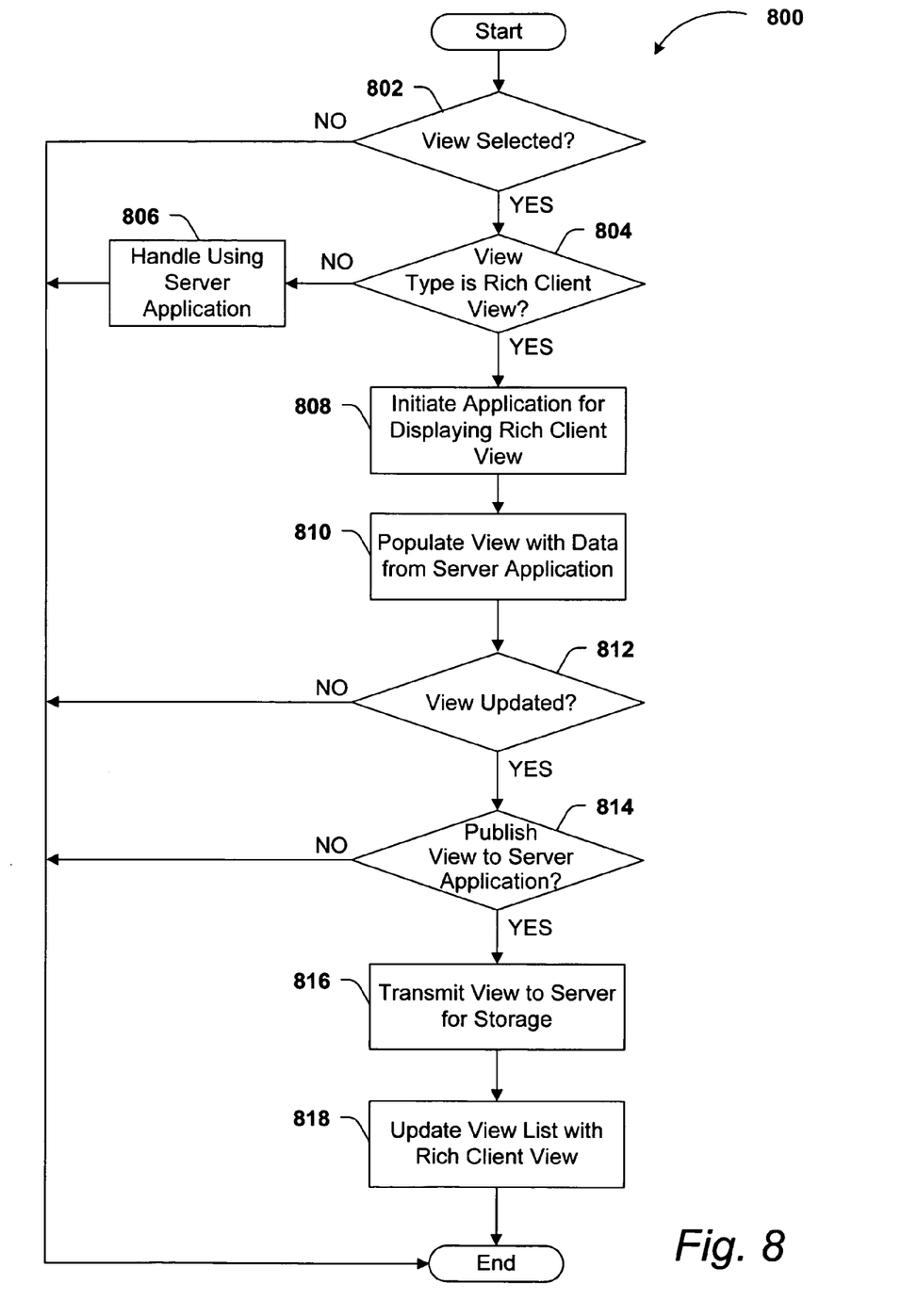
FIG. 8 illustrates an operational flow diagram of an exemplary process for rendering and updating a rich client view, in accordance with one embodiment of the present invention.

FIG. 8 illustrates an operational flow diagram of an exemplary process for rendering and updating a rich client view, in accordance with one embodiment of the present invention. Process 800 starts when a user is selecting a view among the views provided in the view list provided in association with particular server application file. Processing continues with view selection operation 802.

View selection operation 802 determines whether a view has been selected from among the views available in the view list. In one embodiment, when a view is selected, a selection notification may be presented to the user to select whether to open the document for editing or just for display. If a view is not selected, process 800 ends, and processing moves on to other tasks such as creating new views, or other manipulations of the data. However, if a view is selected from those available, processing continues with view type determination operation 804.

View type determination operation 804 determines the type of view selected by the user in the view selection web page. The view may correspond to a web based view or a rich client view. If the view does not correspond to a rich client view, processing moves to server handling operation 806.

Server handling operation 806 allows the server to handle generation of the view since the view is not a rich client view. If generation of the view is passed to the server application for handling, process 800 ends, and processing moves on to other tasks such as creating new views, or other manipulations of the data.

Alternatively, if the view does correspond to a rich client view in view type determination operation 804, processing continues with client initiation operation 808. Client initiation operation 808 initiates the client application corresponding to the view type selection made. For example, if the view type selected was a database management application view, then the database management application is initiated. In one embodiment, an ActiveX control is used to launch the application that corresponds to the rich client view selected. After the appropriate application is launched, processing continues with view population operation 810.

View population operation 810 populates the rich client view in the client application with the data for the view from the server. The data corresponds to the data included in the associated server application file. Once the rich client view is populated with the data, processing continues with update decision operation 812.

Update decision operation 812 determines whether the rich client view has been updated while rendered within the client application. In one embodiment, a user may perform edits to the rich client view. If no update to the view has occurred, the view does not need to be republished, process 800 ends, and processing moves on to other tasks such as creating new views, or other manipulations of the data. However, if an update has occurred to the rich client view, the view does need to be republished to reflect the changes, and processing continues with publication decision operation 814.

Publication decision operation 814 determines whether the completed rich client view should be published back to the server application. In one embodiment, a notification is launched that requests the user to decide whether to publish the application back to the server. In one embodiment, the notification makes a statement such as, "This view was opened from a server. Do you desire to republish this database on the server? The database will be stored in a document database and the views will be available from their associated server application files." The user is then able to decide whether to publish the view to the server. In one embodiment, when a new rich client view is published back to the server application, the server application populates a database file that is associated with the server application file with the view. The database file includes the views already existing for that server application file. This allows the new view to be stored consistently with the other views of the server application file, rather than storing the newly created rich client view separately. If the decision is made not to publish the view to the server, process 800 ends, and processing moves on to other tasks such as manipulating existing views, or other manipulations of the data.

Alternatively, if a decision is made to publish the view to the server, processing continues with transmission operation 816. Transmission operation 816 transmits the view to the server and stores the view in the document database (e.g., document database 204 of FIG. 2). Once the view is stored, processing continues with update view list operation 818.

Update view list operation 818 updates the view lists associated with the related server application files to include an entry for the rich client view. In one embodiment, the entry provides a link to the view included in the document database. In another embodiment, the related application files correspond to those files with underlying data that corresponds to the underlying data of the rich client view. In still another embodiment, a server-side component populates the view list with the rich client view and associates the rich client view with a uniform resource locator (URL) that identifies the view document in the document database. In an additional embodiment, the rich client view in the view list also identifies the particular view in the view document to which the listed rich client view applies. After the view lists are updated, process 800 ends, and processing moves on to other tasks such as manipulating existing views, or other manipulations of the data.

Although the invention has been described in language that is specific to structural features and/or methodological steps, it is to be understood that the invention defined in the appended claims is not necessarily limited to the specific features or steps described. Rather, the specific features and steps are disclosed as forms of implementing the claimed invention. Since many embodiments of the invention can be made without departing from the spirit and scope of the invention, the invention resides in the claims hereinafter appended.

What is claimed is:

1. A computer-implemented method for integrating a rich client view of data within a server presentation of data, the method comprising:

including the rich client view of data with web based views provided according to the server presentation of data associated with a portal server application when the rich client view is created on a client using a rich client application, wherein the rich client view is integrated among the web based views in a view list such that the rich client view is a peer of the web based views; wherein the web based views are views of data provided by the portal server application on the server; wherein the web based views are limited in features and qualities of the view by features that the portal server application user interface provides; wherein the rich client view is presented by the rich client application on the client that includes views separate from the web based view provided by the portal server application; wherein data presented in the rich client view may be changed and entered, and data from the view is usable outside of the context of the portal server application; and launching the rich client application on the client to render the rich client view in response to a selection to render the rich client view, wherein the selection is integrated within the server presentation of data.

2. The computer-implemented method of claim 1, further comprising creating the rich client view in response to a selection of the rich client view from a view selection web page provided in association with the server presentation of data.

3. The computer-implemented method of claim 2, wherein the view selection web page provides alternative types of views for creation in association with the server presentation of data.

4. The computer-implemented method of claim 3, wherein the alternative types of views includes both web based views and the rich client view.

5. The computer-implemented method of claim 1, further comprising determining whether the separate application corresponds to an application in which the rich client view was created before launching the rich client application.

6. The computer-implemented method of claim 5, further comprising launching a different application on the client to render the rich client view.

7. The computer-implemented method of claim 1, further comprising determining whether to publish the rich client view to the server when the rich client view is at least one of created and modified.

8. The computer-implemented method of claim 7, wherein the determination of whether to publish is triggered by a save operation occurring for the rich client view within the separate application.

9. The computer-implemented method of claim 7, wherein publishing the rich client view to the server comprises transmitting the rich client view to the server and storing the rich client view in a document database and updating the view list on the server.

10. The computer-implemented method of claim 9, wherein the document database corresponds to a storage location for views that are launched according to the server presentation of data and the rich client application.

11. The computer-implemented method of claim 1, wherein integrating the selection within the server presentation of data further comprises providing the rich client view in a list of views that includes the web based views associated with server presentation of data.

12. The computer-implemented method of claim 1, wherein the server presentation of data corresponds to a display of at least one web page corresponding to a portal server application.

13. A computer-readable storage medium having stored thereon instructions that when executed implements the computer-implemented method of claim 1.

14. A computer-implemented system, comprising:

a server application that is arranged to include a server application file, wherein the server application provides a presentation of data that corresponds to the data corresponding to the server application file;

a rich client view that is configured to provide an alternate presentation of data, wherein the rich client view is integrated among web based views associated with the server application file; and a client application that is arranged to provide interaction with the rich client view, wherein the client application is launched in response to a selection of the rich client view within the presentation of data provided by the server application file; wherein the web based views are views of data provided by the server application; wherein the web based views are limited in features and qualities of the view by features that the portal server application user interface provides; wherein the rich client view is presented by the client application on the client that includes views separate from the web based view provided by the portal server application; wherein data presented in the rich client view may be changed and entered, and data from the view is usable outside of the context of the server application.

15. The system of claim 14, wherein the selection of the rich client view is made from a list of views provided in association with the server application file.

16. The system of claim 14, wherein the selection of the rich client view is made from a view selection page that provides types of views available for creation in association with the server application file.

17. The system of claim 14, further comprising a publication notification that is arranged to determine whether to publish the rich client view to the server after the rich client view is at least one of provided and modified by the client application.

18. The system of claim 14, further comprising a document database that is associated with the server application file, wherein the document database includes the rich client view associated with the server application file.

19. A computer-readable storage medium having stored thereon instructions that when executed implements the system of claim 14.

20. A computer-readable storage medium having stored thereon computer-executable instructions for integrating a rich client view of data within a server presentation of data, the computer-executable instructions comprising:

from a portal server application: presenting a view selection user interface element for receiving a type of view to be created; wherein the view created is one of a web based view and a rich client view; wherein the web based view is a view of data provided by the portal server application on the server; wherein the web based view is limited in features and qualities of the view by features that the portal server application user interface provides; wherein the rich client view is presented by a rich client application on a client that includes views separate from the web based view provided by the portal server application; wherein data presented in the rich client view may be changed and entered, and data from the view is usable outside of the context of the portal server application;

determining whether to create at least one of the web based view and the rich client view;

instantiating a view selection section when a determination is made to create at least one of a web based view and the rich client view;

determining a type of view selected for creation when the determination is made to create at least one of a web based view and the rich client view;

in response to determining a selection to create a rich client view, initiating a rich client application on the client;

determining whether creation of the rich client view on the client is complete;

receiving the rich client view for inclusion in a view list presented by the portal server application; wherein the view list includes web based views that are associated with the portal server application and rich views that are associated with the rich client application; and updating the view list on the server.

* * * * *

UNITED STATES PATENT AND TRADEMARK OFFICE
CERTIFICATE OF CORRECTION

| | | |
|---|---|---|
| PATENT NO. | : 7,475,075 B2 | Page 1 of 1 |
| APPLICATION NO. | : 11/223455 | |
| DATED | : January 6, 2009 | |
| INVENTOR(S) | : Gregory S. Lindhorst et al. | |

It is certified that error appears in the above-identified patent and that said Letters Patent is hereby corrected as shown below:

Title page, in field (54), under "Title" column 1, lines 1-2, delete "INTEGRATION RICH CLIENT VIEWS IN SERVER PRESENTATIONS" and
insert -- INTEGRATING RICH CLIENT VIEWS IN SERVER PRESENTATIONS --, therefor.

In column 1, lines 1-2, delete "INTEGRATION RICH CLIENT VIEWS IN SERVER PRESENTATIONS" and insert -- INTEGRATING RICH CLIENT VIEWS IN SERVER PRESENTATIONS --, therefor.

Signed and Sealed this
Twelfth Day of July, 2011

David J. Kappos
*Director of the United States Patent and Trademark Office*